United States Patent [19]

Pruitt

[11] Patent Number: 5,542,254
[45] Date of Patent: Aug. 6, 1996

[54] CRYOGENIC COOLER

[75] Inventor: Gerald R. Pruitt, San Pedro, Calif.

[73] Assignee: Hughes Aircraft Company, Los Angeles, Calif.

[21] Appl. No.: 286,859

[22] Filed: Aug. 5, 1994

Related U.S. Application Data

[63] Continuation-in-part of Ser. No. 48,040, Apr. 15, 1993, abandoned.

[51] Int. Cl.⁶ .............................. F25B 9/00; F25B 19/00; F25D 19/00
[52] U.S. Cl. ................... 62/06; 62/51.1; 62/295; 62/383
[58] Field of Search ................... 62/6, 51.1, 295, 62/298, 383

[56] References Cited

U.S. PATENT DOCUMENTS

| | | | |
|---|---|---|---|
| 3,851,173 | 11/1974 | Taylor et al. | 250/352 |
| 4,190,106 | 2/1980 | Dunmire et al. | 62/51.1 |
| 4,194,119 | 3/1980 | MacKenzie | 62/51.1 |
| 4,324,104 | 4/1982 | Horn et al. | 62/298 X |
| 4,344,302 | 8/1982 | Jarrett, Jr. et al. | 62/51.1 |
| 4,412,427 | 11/1983 | Horn et al. | 62/298 |
| 4,501,131 | 2/1985 | Gaskin et al. | 62/51.1 |
| 4,763,483 | 8/1988 | Olsen | 62/383 X |
| 4,862,697 | 9/1989 | Tugal et al. | 62/295 X |
| 4,872,321 | 10/1989 | Buchanan | 62/51.1 |
| 5,056,319 | 10/1991 | Strasser | 62/295 X |
| 5,129,232 | 7/1992 | Minas et al. | 62/295 X |

FOREIGN PATENT DOCUMENTS

| | | | |
|---|---|---|---|
| 1592672 | 9/1990 | U.S.S.R. | 62/295 |

*Primary Examiner*—Christopher Kilner
*Attorney, Agent, or Firm*—Elizabeth E. Leitereg; Terje Gudmestad; W. K. Denson-Low

[57] ABSTRACT

An improved cryogenic cooler 100 includes a flange 106 with an elongated pressure vessel 120 extending therefrom. The pressure vessel 120 is connected to the flange 106 at a proximal end thereof. The pressure vessel 120 is adapted to cool a surface in the proximity of the distal end thereof. Vibration isolation is provided at both proximal and distal ends of the elongated pressure vessel. A coupler 126 serves to maintain a gap between the distal end of the pressure vessel 120 and the surface at cryogenic temperatures. In a specific embodiment, the coupler 234 has a coefficient of thermal expansion which is less than the coefficient of thermal expansion of an end cap 224 on the pressure vessel. The coefficients of expansion are chosen to provide a tight slip fit between the cooler and the coupler at ambient temperatures and a very small continuous air gap at cryogenic temperatures. Another novel feature is the provision of an energy-absorbing ring 114 within the flange to dissipate vibration therein.

14 Claims, 4 Drawing Sheets

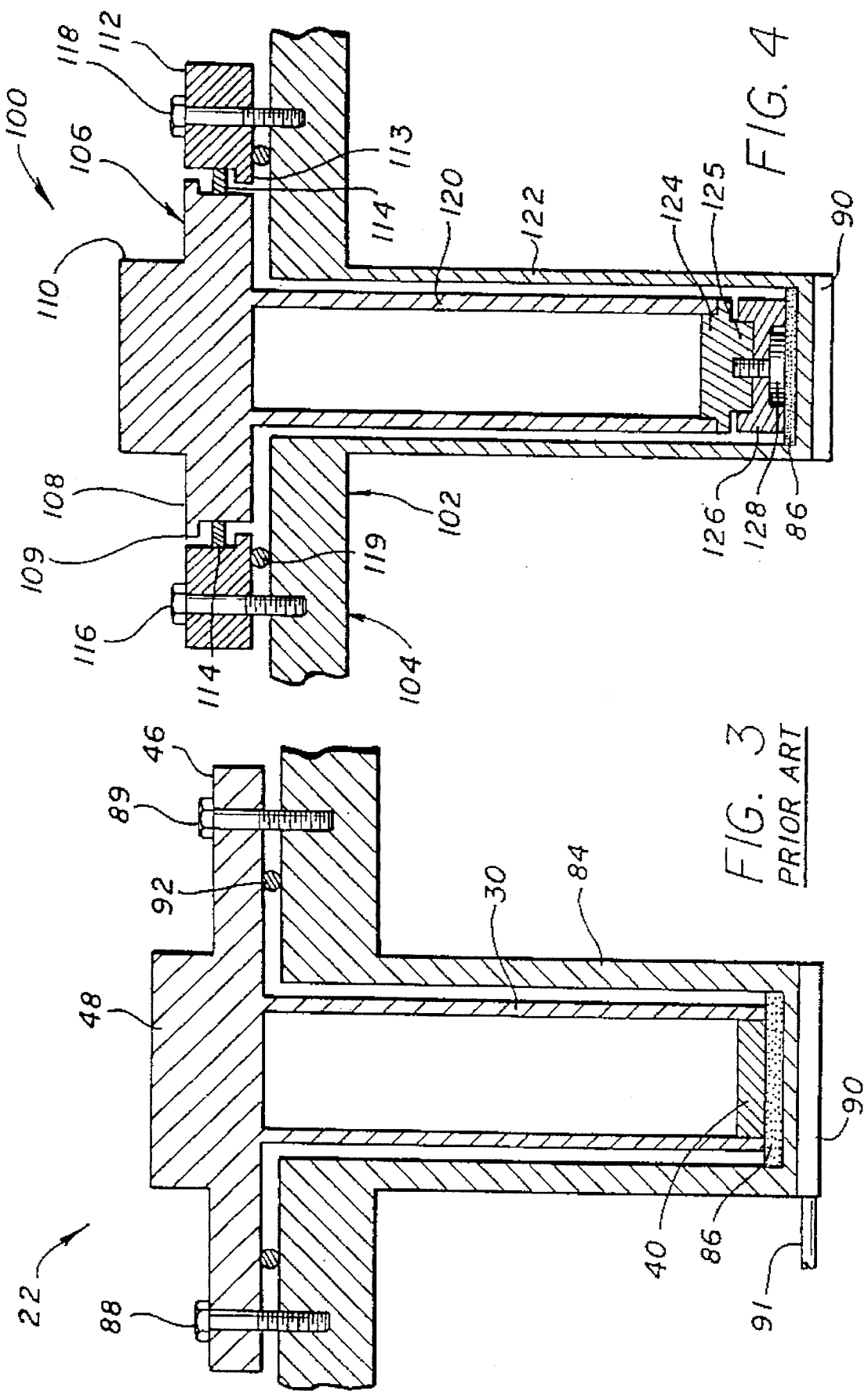

CRYOGENIC COOLER

BACKGROUND OF THE INVENTION

This application is a continuation-in-part of U.S. patent application Ser. No. 08/048,040 filed Apr. 15, 1993, now abandoned.

FIELD OF THE INVENTION

The present invention relates to cooling systems for infrared devices. More specifically, the present invention relates to methods and apparatus for minimizing mechanical vibrations of cryogenic expansion engines.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

DESCRIPTION OF THE RELATED ART

Infrared detectors, high performance cameras and other devices typically require cryogenic cooling for optimal performance. Typically, a cryogenic cooler is inserted into a dewar (or housing) into which one or more detector elements are mounted. On receipt of light or heat energy, the detector elements provide a low level output signal which is carried out of the dewar to detector circuitry over very fine wires to reduce the conducted thermal load between the detector element and the warm connector surfaces on the exterior of the dewar. Any relative motion of the wires creates a change in the relative capacitance of the signal leads. The change in capacitance in the presence of current generates a false signal known in the art as "microphonics".

Another source of microphonic signals is due to stress and strain between the cool surface of the dewar and the detector. The strain in the detector induces a piezoelectric effect which generates a false signal in the form a voltage in the detector element at the frequency of motion of the cool surface.

Thus, in general, infrared devices are extremely sensitive to vibration. Unfortunately, current designs for a very efficient, effective and frequently used cooling system, the Stirling cycle cooler, tend to induce a considerable amount of vibration into the dewar.

A Stirling cycle cooler is an efficient and compact cryogenic cooling device. The original Stirling cycle engine consisted of a compressor piston with a cylinder, an expansion piston with a cylinder, and a drive mechanism. The drive mechanism converted the rotary motion of a motor and crankshaft to a reciprocating motion of the two pistons. The two pistons were arranged to be ninety degrees out of phase. A regenerative heat exchanger (regenerator) was included in the expansion piston to thermally isolate gas at the compressor piston head space from gas at the expansion piston head space. The original Stirling cycle engine in which the compressor piston and expander piston are mechanically linked is known as the Integral Stirling Engine.

When operated between two temperature sinks, the Stirling cycle mechanism can produce shaft power when operated in one direction (Stirling engine) or pump heat from a low temperature to a high temperature, and thereby provide refrigeration, when driven in the reverse direction (Stirling cooler).

The original thermodynamic cycle developed early in the last century consisted of two isothermal processes and two constant volume processes. Early implementations of the Stirling cycle did not duplicate the distinctly separately phased motions of prior art designs, but were a combination of the various motions occurring simultaneously instead. That is, in the Stirling engine, the compression and the expansion processes occurred simultaneously in a sinusoidal manner in which the expander motion lagged the compressor motion by 90 degrees.

Later developments produced the Split-Stirling cycle cooler. This device included all of the components of the integral Stirling cycle cooler, without mechanical linkage to the expander piston. This permitted the expander to be located remote from the compressor. The expander piston in this device was no longer driven by a connecting rod and crankshaft, but rather by means of an additional drive piston. The drive piston was attached to the warm end of the expander piston and protruded into a small cavity at the extreme end of the expander housing. This created a "spring volume" as the gas acted as a spring on the drive piston.

The piston was sealed so that gas could not readily enter the spring volume from the expander side. The drive piston was pneumatically reciprocated by cyclic gas pressure changes produced by the compressor piston driven by the compressor crankshaft. The gas thus supplied to and withdrawn from the expander engine traveled through a supply tube commonly referred to as a transfer line. The two subassemblies were thus often interconnected with a sufficiently small diameter gas transfer line to effectively decouple vibration and motion of the expander subassembly from vibration and motion of the compressor subassembly. This was particularly of interest when detectors in dewars mounted on the expander subassembly were isolated by a gimballed mechanism from the compressor subassembly. This configuration provided a gimballing of the detector without introducing large, detrimental spring torques to the gimbal torque motors. This design permitted the compressor, which was large compared to the expander assembly, to be remotely located where available volume and heat rejection capability existed.

A natural evolution of this design was the relocation of the relatively heavy regenerator from the reciprocating displacer piston to the (stationary) cold cylinder. Thus, the displacer piston could be hollowed out making it much lighter than prior designs. This provided a reduction in the vibration output of the expander. Notwithstanding these refinements, Stirling cycle coolers continue to vibrate the associated mounting structure and, in particular, to the detector assembly.

Conventional solutions to this problem include:

1) the use of a bellows mechanism between the cold tip of the dewar with the detector mounted thereto, and the cold tip of the expander, and 2) the provision of a small air gap between the cold tip of the expander and the dewar cold well in which the detector is mounted.

Unfortunately, the effect of the bellows has been limited inasmuch as the mechanism remains mechanically coupled. Accordingly, the low fundamental frequency components are coupled into the detector substrate area.

The noncontacting air gap approach suffers from the fact that a large temperature gradient is developed between the warm end of the dewar and expander and the associated cold ends. Differences in the materials of construction of the dewar cold well and the expander cold cylinder result in a variation in the air gap due to differences in coefficient of thermal expansion of the materials as the temperature gradient is established. Thus, the air gap tends to increase from typically less than 1 mil at room temperature to greater than 2 mils at cryogenic temperatures depending on the length of the cold cylinder and the difference in the coefficient of thermal expansion between the materials of the expander cold cylinder and those of the dewar cold well. This complicates the design, making it difficult to maintain a consistent gap. To address this problem, some designers have added capacity to the cooler in order to maintain the performance of the detector.

Thus, there is a need in the art for a technique for mitigating microphonic effects in a cryogenic cooler with minimal thermal loss.

SUMMARY OF THE INVENTION

The need in the art is addressed by the present invention which provides an improved cryogenic cooler. The invention includes a flange with an elongated pressure vessel extending therefrom. The pressure vessel is connected to the flange at a proximal end thereof. The pressure vessel is adapted to cool a surface in the proximity of the distal end thereof. A novel coupler is mounted between the distal end of the pressure vessel and the surface. In a specific embodiment, an end cap is mounted at the distal end of the pressure vessel and the coupler has a coefficient of thermal expansion which is less than the coefficient of thermal expansion of the end cap. The coefficients of expansion and relative dimensions are chosen to provide a tight fit between the cooler and the cooled surface at ambient temperatures and a consistent air gap at cryogenic temperatures. Another novel feature is the provision of an energy absorbing ring within the flange to dissipate vibration therein so that the elongated pressure vessel is vibrating isolated at both distal and proximal ends.

BRIEF DESCRIPTION OF THE DRAWINGS

FIG. 3 is a simplified cross-sectional view of the conventional cryogenic cooler of FIG. 2.

FIG. 4 is a simplified cross-sectional view of a cryogenic cooler according to one embodiment of the present invention.

DESCRIPTION OF THE INVENTION

Figure 1:
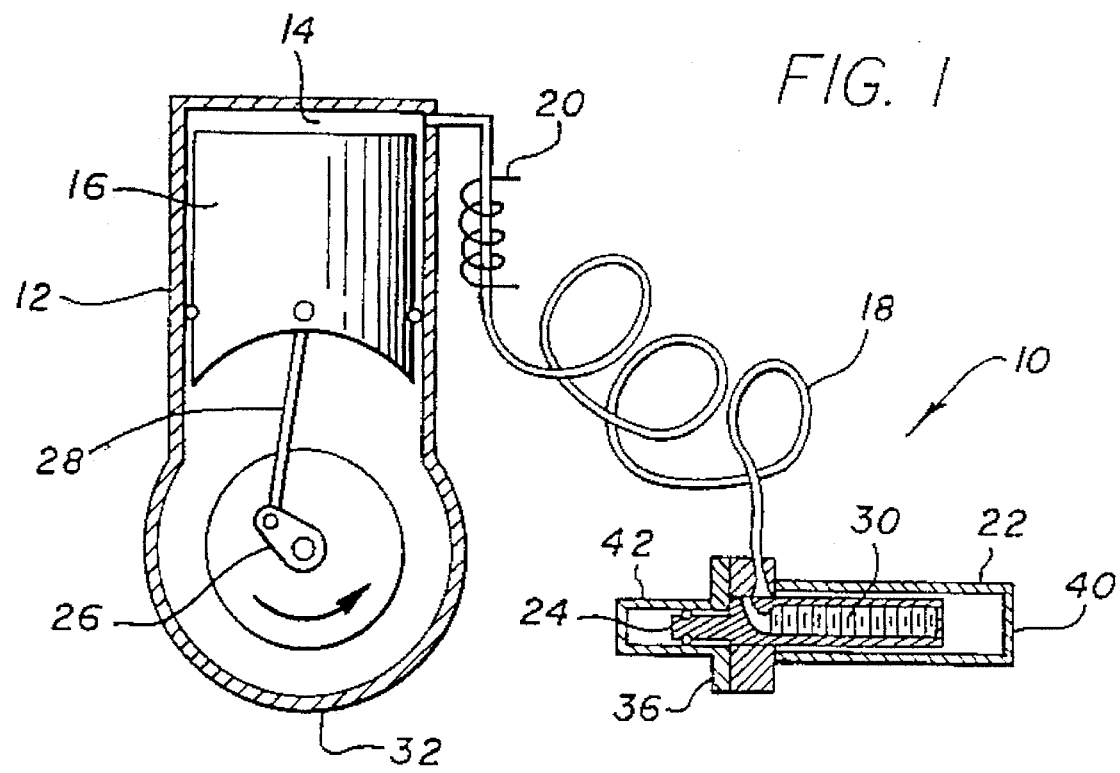
FIG. 1 is a cross-sectional view of a conventional Split-Stirling cycle refrigerator.

The invention is described in an illustrative Split Stirling application to disclose the advantageous teachings thereof. FIG. 1 shows a typical Split-Stirling cycle cryogenic refrigerator 10. The refrigerator 10 generally includes a compressor 12 having a cylinder 14. A compressor piston 16 is mounted in the compressor cylinder 14. A gas medium connection line 18 communicates with a cryogenic expander/cooler 22 and passes through a cryogenic heat exchanger 20. The cryogenic cooler 22 is in physical communication with a detector (not shown) at a cooled terminal cap 40. A prime mover (also not shown) drives the piston 16 and charges the refrigerator 10.

Helium is compressed and the heat therein is rejected by the piston 16, the compressor cylinder 14 and the heat exchanger 20. Thereafter, the gas is forced through a regenerator 30 in the cooler 22 by the motion of a piston 24 within the cooler 22 causing it to be cooled at constant volume. The cooler piston 11 is pneumatically driven. The cooler 22 incorporates a pneumatic spring volume 42 to provide reciprocating action of the cooler piston 11.

The heat removed from the gas is stored in the regenerator. Cold gas from the regenerator is next expanded isothermally while absorbing heat from a surface to be cooled in contact with end cap 40. The gas is then forced back through the regenerator where it is heated at constant volume. The energy stored in the regenerator 30 is then transferred back to the gas. Heat rejection to ambient is provided by the heat exchanger 20.

Figure 2:
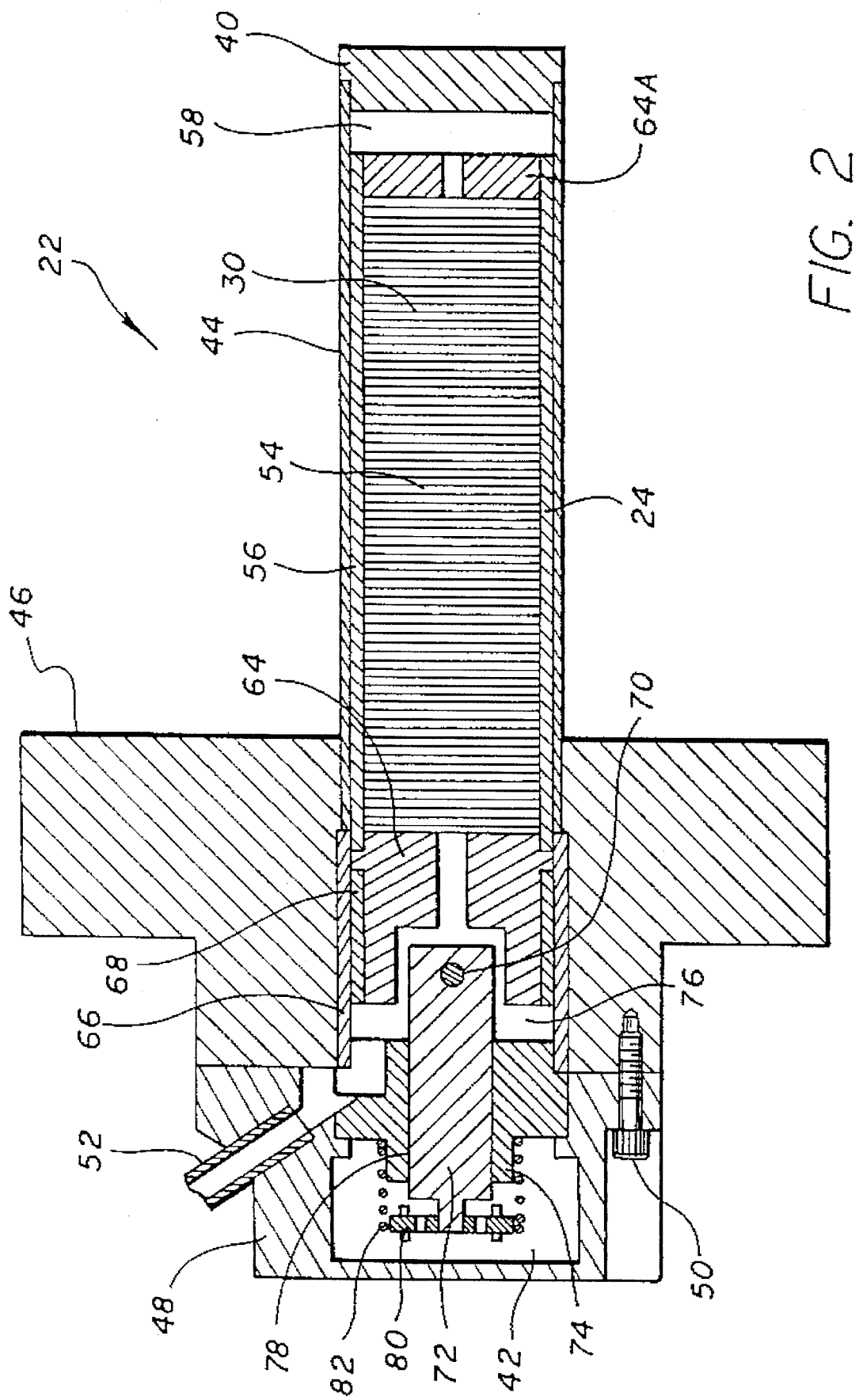
FIG. 2 is a detailed cross-sectional view of a conventional cryogenic expander/cooler utilized in a Split-Stirling cycle refrigerator of FIG. 1.

A more detailed view of the cooler 22 used with the Split Stirling refrigerator of the prior art is shown in FIG. 2. The cooler is surrounded by an outer thin-walled pressure vessel 44 and a cylindrical flange 46 which comprises a housing structure. The outer pressure vessel 44 is a long, thin-walled, tubular structure extending between the flange 46 and the terminal cap 40. The pressure vessel 44, unlike the flange 46, is comprised of a poor thermal conductor such as stainless steel of approximately 0.005–0.008 inch thick. The function of the pressure vessel 44 is to house the internal elements of the cooler 22. The flange 46 facilitates the mounting of the cooler 22 as well as heat dissipation. The pressure vessel 44 is securely attached to the flange 46, typically by brazing.

Mounted on the rear side (e.g., ambient side) of the flange 46, as shown in FIG. 2, is a cooler cap 48 which is a structural cover bolted in place by a plurality of fasteners 50. The cooler cap 48 houses each of the components mounted behind the flange 46. Penetrating the cooler cap 48 is a passageway 52 which interconnects with the gas medium connection line 18 shown in FIG. 1. The passageway 52 provides a means for delivering the gas medium from the compressor 12 to the regenerator 30 and to the various other volumes within the cooler 22.

Mounted immediately within a cylindrical displacer structure 24 is the regenerator 30 which is a cylindrical structure fashioned to fit within the displacer structure. The regenerator 30 is comprised of a porous matrix of screens 54 which permit the gas medium to flow therethrough. The gas flowing through the porous matrix of screens 54 either absorbs the latent heat from the regenerator matrix or deposits latent heat into the high thermal enthalpy material comprising the porous matrix. Therefore, the exiting gas is either precooled or preheated, depending upon the direction of the gas flow. The screens 54 are typically comprised of a fine mesh material such as stainless steel, for example. In the assembly, the screens 54 are stacked on top of each other so that the layers are arranged perpendicular to the flow directions of the gas medium.

Generally, the gas medium is pumped in from the compressor and enters the ambient (warm) end of the cooler 22. From there, the gas medium enters the regenerator 30 from the passageway 52. The gas is precooled by progressively cooler screens 54 that are stacked in the regenerator so that when the gas exits into an expansion volume 58 at the cold end of the cooler (e.g., terminal cap 40 as shown in FIG. 2), the gas is nearly at the expansion temperature. The terminal cap 40 is the coldest part of the cooler 22 and is that portion that is in mechanical communication with the detector device that is to be cooled (not shown in FIG. 2). The terminal cap 40 is comprised of a metal having a high thermal conductivity and may be fashioned from, for example, pure nickel or copper.

The displacer 24 is comprised of a thin-walled fiber-glass shell 56, an enclosed regenerator 30, a cold end closure 64A and a warm end closure 64 which couples the displacer 24 to a drive piston 72 and a displacer seal 68 described hereinafter as shown in FIG. 2. The displacer fiberglass shell 56 acts as an insulating structural body which prevents heat flow from the ambient end to the cold end of the displacer 24 while the gas medium flows between the expansion volume 58 and the warm passageway 52. It is this fiberglass shell that reciprocates within the pressure vessel and which is closed at the cold end by an end cap 64A. In general, the gas medium is moved from the ambient end to the cold end of the cooler 22 during a first stroking motion, and the gas medium is moved from the cold end to the ambient end during a second stroking motion. During the stroking motions, the gas medium is forced to flow through the displacer 24 and the regenerator 30.

Mounted within the interior of the flange 46 is a seal sleeve 66. Just inboard of the seal sleeve 66 is the displacer seal 68. The displacer seal 68 and the warm end closure 64, when assembled within the seal sleeve 66, function to seal the sliding displacer 24 so that the gas medium cannot flow through the annular space between the displacer 24 and the thin-walled pressure vessel 44. Thus, the gas is forced to flow through the displacer 24 and through the porous screens 54 of the regenerator 30.

Connected to the warm end closure 64 by a hinge pin 70 is the small drive piston 72. The hinge pin 70 is a small metal pin that passes through and retains the drive piston 72 to the warm end closure 64, providing good, flexible alignment between the piston 72 and the displacer 24. The drive piston 72, also known as a plunger, provides the area differential of the two displacer ends necessary to provide the motive forces to the displacer 24. Thus, under the appropriate conditions, the displacer 24 strokes onto or away from the drive piston 72. This is accomplished by virtue of a pressure differential that exists across the displacer walls. The clearance space between the drive piston 72 and the interior of the cooler cap 48 is sealed by a piston sleeve 74. The piston sleeve 74 acts to guide the drive piston 72 and to prevent substantial gas leakage into or out of the spring volume 42 within the cooler cap 48.

A displaced (swept) volume 76 exists between the piston sleeve 74 and the displacer warm end closure 64. The swept volume is a clearance which permits the displacer 24 to stroke to the ambient end of the cooler, the displacer 24 being shown at the mid-position in FIG. 2. A sealed clearance 78 in the form of a small annular space is located between the drive piston 72 and the piston sleeve 74. The clearance is utilized to seal the displacer 24 from the oscillations of the spring volume 42. Mounted at the end of the small drive piston 72 is a bumper 80 that extends into the pneumatic spring volume 42. The bumper 80 is comprised of a steel core with a rubberlike material affixed thereon. The bumper 80 functions to strike the piston sleeve 74 and to stop the displacer 24 from impacting the tip of the cold terminal cap 40 when the piston 72 strokes from the ambient end to the cold end. Such impact would otherwise generate mechanical vibrations that would be transmitted to the detector device. When the piston strokes from the cold end to the ambient end, the bumper 80 serves to cushion the piston 72 from impact with the inside of the cooler cap 48.

Under steady state conditions, the forces within the cooler 22 are balanced and reverse quickly enough so that the displacer 24 never strokes to the displacer limits or impacts the bumper 80. A centering spring 82, as shown in FIG. 2, serves to prevent the displacer 24 from drifting too close to either end of its stroke. However, during the cool-down periods, while the working fluid (helium gas) is still warm, stroking of the displacer 24 is more severe due to lower fluid pressure drop through the regenerator 30, and the bumper 80 is typically impacted by the displacer 24. The pressure wave produced by the compressor 12 is sinusoidal in nature so that the pressure in the various cooler volumes varies sinusoidally. However, the gas pressure within the spring volume 42 is roughly constant and is at approximately the mean pressure point of the oscillating pressure wave.

In practice, a small volume of gas medium leaks past the drive piston 72 through the sealed clearance 78. As the pressure wave varies sinusoidally, a state of equilibrium is established in the spring volume 42. Such a condition is characterized by equal leakage in both directions of the sealed clearance such that the pressure in the spring volume equals the mean pressure of the oscillating pressure wave. This mean pressure is with respect to the pressure of the swept volume 76 and the expansion volume 58, each of which experiences the cyclic pressure fluctuations. The centering spring 82 connected between the piston sleeve 74 and the bumper 80, although not essential, is utilized for aligning the displacer 24 at the midpoint of the strike. Such a design is useful for preventing the displacer 24 from impacting the extreme ends of the stroke cycle. It is noted that the relative force generated by the spring volume 42 is much greater than the alignment force created by the centering spring 82.

In operation, the cooler 22 is pressurized with the sinusoidal pressure wave so that the pressure rises from some minimum to some maximum pressure. The expansion volume 58 and the warm swept volume 76 are then pressurized, and a pressure force is established. As gas flows from the warm swept volume 76 to the cold expansion volume 58 through the regenerator 30, a small pressure difference is established between these two volumes. This pressure difference is in opposition to the flow of gas through the regenerator 30. Hence, as working gas pressure increases, gas flows from the warm swept volume 76 to the cold expansion volume 58. The gas pressure, $P_W$, in the warm swept volume 76 will be somewhat higher than the gas pressure, $P_c$, in the cold expansion volume 58.

The force balance equation for the displacer neglecting the effect of the spring 82 is:

$$F = (P_C - P_W)A_D + (P_W - P_S)A_{DP} \qquad [1]$$

where $P_C$, $P_W$ and $P_S$ are the respective pressures within the cold expansion volume 58, the warm swept volume 76 and the spring volume 42 and $A_D$ and $A_{DP}$ are the respective cross-sectional areas of the displacer 24 and the drive piston 72. In practice, the pressure drop $P_C - P_W$ across the regenerator 30 is small compared with the pressure drop $P_W - P_S$ across the drive piston 72.

Hence, when $P_W$ is greater than $P_S$, then F is positive, implying a net force towards the warm end. It can be seen that the forces reverse as the exterior pressure fluctuates during the cycle and that the inertia of the displacer is the only opposition to the pressure forces.

Therefore, when the magnitude of the sinusoidal pressure wave is high, the displacer 24 strokes from the cold end to the ambient end. The displacer 24 continues to stroke from the cold end to the ambient end until the bumper 80 impacts the cooler cap 48, or until the sinusoidal pressure has dropped sufficiently to reverse the force balance as the compressor 12 begins to withdraw gas from the cooler 22 during the suction stroke. Thus, the gas medium is initially pumped into and then withdrawn from the cooler 22. The varying gas pressure within the expansion volume 58 begins to drop and when the varying pressure drops below the mean point constant pressure of the spring volume 42, the forces reverse. While the pressure force summation may have reversed direction, the kinetic energy may still cause the cooler to continue to move in opposition to that force briefly during the cycle. During the steady state under cooled-down operation, the forces and the stroke are so designed as to permit the cooler 22 to stroke nearly to the limits, but not enough to impact the bumper 80 at either end of travel.

Thus, when the magnitude of the sinusoidal pressure wave is low (e.g., gas pressure in the spring volume 42 exceeds the mean value of the oscillating pressure wave), the reciprocating drive piston 72 causes the displacer 24 to stroke from the ambient end to the cold end of the cooler 22. Then, the entire cycle repeats with the net effect being that the displacer 24 strokes from the cold end to the ambient end when the pressure in the cooler is high, and from the ambient end to the cold end when the pressure in the cooler is low. This constitutes net work performed by the gas in the expansion volume on the displacer for providing an equivalent refrigeration rating. By performing work on the displacer 24, the gas transmits energy to the displacer and a portion of this energy, in turn, is simultaneously deposited back into the gas at the opposite (ambient) end of the displacer 24. This work expenditure simultaneously lowers the temperature of the terminal cap 40 for cooling a detector.

With the design and operation of a conventional cryogenic cooler in mind, the advantages of the present invention may be illustrated with respect to FIG. 3 which is a simplified representation of the conventional cooler 22 of FIG. 2. For infrared detector cooling applications, the cooler 22 is mounted so that the cooler stem rests within the well of the dewar housing 84 on a felt pad 86. The felt pad is loaded with a conducting (silver loaded) grease to facilitate the flow of heat energy thereacross. Heat is drawn from an infrared detector 90 through the dewar wall and the felt pad 86. The cooler 22 has a solid annular one-piece flange 46 which is secured to the dewar flange by screws 89. The cooler 22 rests on an O-ring 92. The cooler flange 46 is integral with the cooler cap 48.

Because the cooler 22 is connected to the detector 90 by the screws 88 and 89 and is in contact with the vibrating dewar at the terminal cap 40, the mechanical vibrations created by the reciprocating mass are directly transmitted to the detector 90 resulting in optical deflection and distortion of the images received thereby. Vibrations also couple into low signal level electrical leads 91 resulting in relative motion of these leads and false signals associated with capacitance changes of the leads in the presence of a signal current. The problem becomes particularly acute in higher wattage coolers which provide higher net refrigeration capacities but which necessarily require a larger displacer piston 24.

FIG. 4 is a simplified cross-sectional view of the improved expander/cooler 100 of one embodiment of the present invention. As shown in FIG. 4, the cooler is essentially the same as the conventional cooler with the exception that the cooler 100 provides vibration decoupling through implementation of two-part flange and a coupled end cap having components of different coefficients of thermal expansion and specific configurations that take advantage of the different coefficients of thermal expansion. The cooler 100 has an elongated body 120 and is adapted for use with a conventional elongated dewar 102 having a dewar flange 104 and a well 122.

Figure 5:
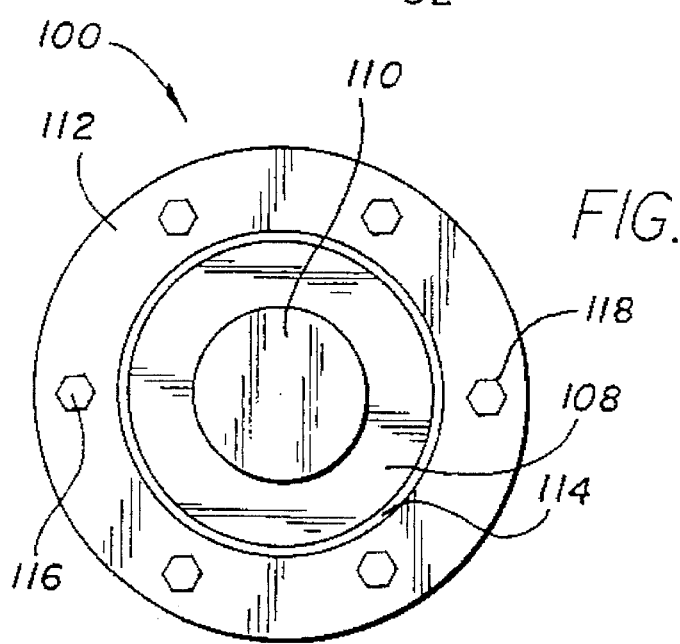
FIG. 5 is a top view of the simplified cryogenic cooler of FIG. 4.

The flange 106 of cooler 100 has two parts, an annular inner portion 108 integral with the cap 110 of the cooler 100, and an annular outer portion 112. The inner portion and the outer portions of the cooler flange 106 are concentric and adapted to provide an annular channel therebetween within which a molded energy-absorbent elastomer ring 114 is disposed. The channel is illustrated in the top view of the cooler provided in FIG. 5.

The ring 114 is bonded to the inner and outer portions of the flange by a suitable bonding agent. The ring 114 may be a filled silicon material or other suitable material. The ring is disposed between an annular extension 109 from the inner portion 108 of the flange 106 and an annular extension 113 from the outer portion 112 of the flange 106 with a gap provided for the displacement thereof. The ring 114 is configured to provide equivalent spring compliance of K such that:

$$f = \omega/2\pi = \frac{1}{2}\pi(K/M)^{1/2} \ll 1000 \text{ Hz} \qquad [2]$$

where f is the resonant frequency of the vibration isolated cooler, K is the equivalent spring compliance and M is the cooler mass excluding the outer portion 112 of the flange 106. In this case, frequencies above 1000 Hertz are effectively decoupled from the detector. In general, the spring constant should be sufficient to support the housing and still damp vibration. This assures that vibration energy will not be absorbed by the ring and is not transmitted to the detector through the dewar flange 104. Thus, the novel two-part design of the flange 106 decouples vibration from the flange of the cooler to the flange of the dewar.

Returning to FIG. 4, vibration is also decoupled at the end cap 124 of the regenerator stem. In accordance with the present teachings, the end cap 124 has a protrusion 125 adapted to retain a screw 128. The retaining screw 128 is not in contact with the pad 86. The screw is noncontacting when inserted into the dewar and serves to allow removal of the stem and coupler 126 as an integral assembly. The screw 128 retains a coupling or coupler 126 having a coefficient of thermal expansion which is slightly smaller than that of the end cap 124. The isolating coupler 126 and the end cap may be made of metal alloys known in the art.

At ambient temperatures, a tight fit exists between the coupling 126 and the end cap 124. However, as the temperature of the stem drops to cryogenic temperatures, the end cap contracts at a faster rate, thereby creating a small air gap, as shown in FIG. 4. A small air gap is created between the end of the end cap 124 and the coupler 126 which may be retained in contact with the felt pad by a thermal grease. The air gap should appear at a temperature between the ambient temperature and the cryogenic operating temperature to ensure that vibration is decoupled prior to the initiation of operation.

Figure 6:
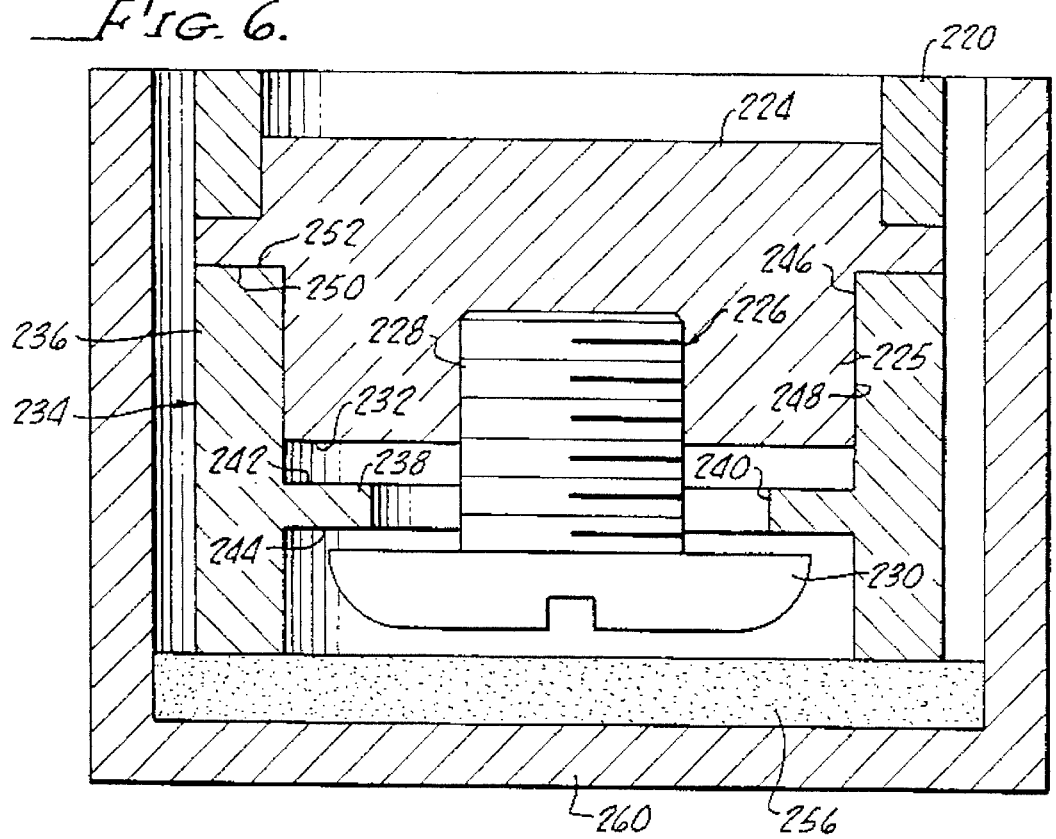
FIG. 6 shows a modified form of the invention in a high temperature configuration.
Figure 7:
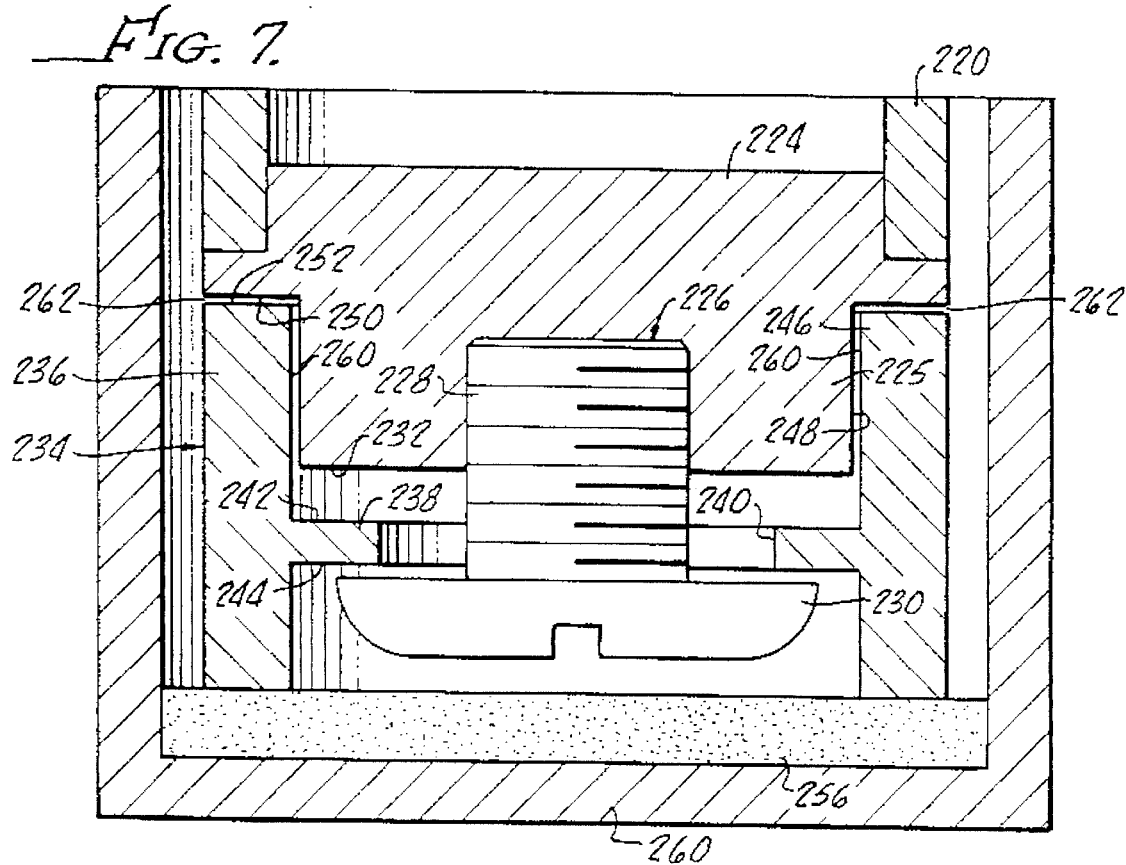
FIG. 7 is an enlarged detail of the distal end of the cooler of FIG. 6 in a low temperature configuration.

A presently preferred embodiment of the present invention is illustrated in FIGS. 6 and 7 and comprises a modification of the distal end of the embodiment shown in FIG. 4. Again, the arrangement uses a coupler having a smaller coefficient of thermal expansion and a unique interfitting configuration of end cap and coupler that uniquely takes advantage of this configuration to provide a small vibration-isolating air gap at low temperature.

In the embodiment of FIGS. 6 and 7, the dewar flange 104 is isolated from the proximal end of the cooler in the same manner as shown in FIG. 4. However, the vibration isolation provided at the distal end of the cooler is arranged to provide a very small vibration isolating gap that completely separates the distal end of the cooler (the cooler end cap) from the distal end of the dewar and therefore from the detector to be cooled. As shown in FIG. 6, cooler body 220 is fitted with an end cap 224 having a distally projecting hub 225. The end cap hub 225 threadedly receives a retaining screw 226 having a shank 228 and a head 230. Screw head 230 is axially spaced from the distally facing end surface 232 of the end cap hub.

The embodiment of FIGS. 6 and 7 is illustrated in FIG. 6 in a high temperature condition and in FIG. 7 in a low temperature condition. A coupler 234 is formed of a substantially right circular cylindrical wall 236 having a continuous circumferential, radially inwardly projecting flange 238. Flange 238 has a radially inwardly facing surface 240 and opposite proximal and distal surfaces 242, 244. In both warm and cool temperature configurations, radial surface 240 is spaced from the shank 228 of screw 226, proximal flange surface 242 is axially spaced from the end surface 232 of end cap hub 225 and distal surface 244 is axially spaced from the head 230 of the screw 226. Hub 225 of the end cap has a radially outwardly facing cylindrical surface 246 which, in the warm temperature condition of FIG. 6, is a tight slip fit against the inner cylindrical surface 248 of the cylindrical wall 236 of the coupler. An axially inwardly (proximally) facing surface 250 of the proximal end of coupler wall 236 is in contact, in the warm condition, with an axially outwardly (distally) facing shoulder or surface 252 of the end cap that surrounds the hub 225. The distal end of cylindrical wall 236 of the coupler is in firm contact with grease pad 256 which, in turn, is in contact with the distal end 260 of the dewar end. As previously described, the dewar end is adapted to contact the device to be cooled, which is not shown in FIGS. 6 and 7.

In this embodiment, as in the embodiment of FIG. 4, the material of the end cap 224 and the material of the coupler 234 are selected to have different coefficients of thermal expansion. The coefficient of thermal expansion of the end cap material is greater than the coefficient of thermal expansion of the coupler material so that when the apparatus cools to its operating temperature, the end cap contracts by a greater amount than does the coupler. The end cap contracts both radially and axially and thereby creates a small but complete and continuous air gap between the end cap and all portions of the coupler that are in contact with the end cap at the warmer temperatures. The condition of the parts at the cooler temperatures is shown in FIG. 7, illustrating the greater thermal contraction of the end cap that creates the air gap. As can be seen in FIG. 7, at the cooler temperature, flange 238 of the coupler is still physically displaced radially and axially from the end cap and the screw 230. Importantly, a small, annular radial gap 260 completely encircles the end cap protrusion and spaces the radially inner surface of the coupler from the radially outwardly facing surface of the end cap protrusion or hub. There also occurs a differential axial contraction that creates an annular axial gap 262 between the distally facing surface 252 of the end cap shoulder that surrounds the protrusion 225 and the proximally facing end surface 250 of the proximal end of the cylindrical wall 236 of the coupler. The two gaps 260, 262 are continuous and interconnected. Each of the gaps 260, 262 is very small, even at the lowest operating temperature. Preferably, these gaps are between 0.1 and 0.5 mils. In a preferred arrangement, these gaps at the coolest operating temperature are about 0.2 to 0.3 mils. By insuring that the gaps are no greater than about 0.5 mil, there is still provided a good thermal path through the air confined within the dewar body 122 and filling the very narrow air gaps. This air path, which is not larger than 0.5 mil, is sufficient to provide good transfer of heat from the coupler to the cooler end cap at the cool temperatures. Note that at both warm and cool temperatures, the distal end of the coupler remains in contact with the grease pad 256 which itself remains in contact with the distal end of the dewar. The grease pad freezes at the low operating temperature to maintain this contact.

The air gaps 260, 262, although small enough to retain a good heat transfer path between the coupler and the end gap, are still sufficient to eliminate transmission of vibration of the end cap and other portions of the cooler to the coupler and thus to the device being cooled. At neither high nor low temperature does the screw or any part thereof contact any part of the coupler. The screw is always retained, as shown, in its threaded engagement within the end of the protrusion on the end cap. As previously stated, the coupler in warm temperature condition is only a tight slip fit on the end cap. When the cooler is removed from the dewar for servicing or other reasons, it is possible that the coupler, being only a tight slip fit on the end cap, might be dislodged and misplaced. To avoid this, the screw 226 is provided. Although the screw contacts solely the end cap protrusion 225, at no time does any part of the screw contact either the coupler or the grease pad, as can be seen in FIGS. 6 and 7.

At warm temperatures, the coupler is a tight slip fit on the end cap and has its radial inner surface and its axial proximal end surface in good tight contact with the corresponding surfaces of the end cap and its hub and shoulder. Thus, during this warm temperature and for a portion of the time during which the apparatus temperature is being lowered from the warm condition to its operating condition, there is good direct thermal contact (actual physical contact) between the end cap and the coupler. At some temperature before the cooler reaches its full operating temperature, the disclosed configurations of end caps and cooler and their different coefficients of thermal expansion cause the air gaps 260, 262 to appear and to remain during the cooling operation.

Thus, it will be seen that the arrangement of FIGS. 6 and 7 provides a cooler which is optimally vibration-isolated from the dewar and the device to be cooled. The cooler is isolated at its proximal end by employment of a two-part flange, as illustrated in FIG. 4, and is vibration-isolated at its distal end by the creation of an air gap having both radial and axial portions that completely isolates the coupler from the end cap.

Use of the described configuration, in which a protrusion or hub and surrounding annular shoulder are formed on the end cap and provide both axially facing and radially facing surfaces for cooperation with axially facing and radially facing surfaces on the coupler, increases the total area of contact at warm temperatures and also increases the total area of air gap at low temperatures. As stated above, the contact between the end cap and coupler, which exists until the lowest operating temperatures are approached, provides a good physical and thermal contact. It also helps to hold the coupler on the end cap. On the other hand, at the cold temperature, the total length of the air gap is increased by the described configuration of hub and shoulder, having both radially-directed and axially-directed portions. Therefore, the total area of the narrow air gap heat transmission path is increased. Accordingly, the described arrangement maximizes heat transfer both at warm and low temperatures and yet provides adequate distal end vibration isolation.

Thus, the present invention has been described herein with reference to a particular embodiment for a particular application. Those having ordinary skill in the art and access to the present teachings will recognize additional modifications, applications and embodiments within the scope thereof.

What is claimed is:

1. A cryogenic cooler comprising:
    a flange and an elongated pressure vessel extending therefrom, said pressure vessel being connected to said flange at a proximal end thereof, and said cryogenic cooler mounted to cool a surface in the proximity of the distal end of said pressure vessel; and
    a coupler having proximal and distal coupler ends,
        said coupler being mounted for movement relative to the distal end of said pressure vessel between a first higher temperature position in which said proximal coupler end is in contact with the distal end of said pressure vessel and a second lower temperature position in which said proximal coupler end is spaced from the distal end of said pressure vessel to define a vibration isolation gap between the distal end of the coupler and the distal end of said pressure vessel.

2. The cryogenic cooler of claim 1 including an end cap mounted at the distal end of said pressure vessel and wherein said coupler has a coefficient of thermal expansion that is different from the coefficient of thermal expansion of said end cap.

3. The cryogenic cooler of claim 2 including an elongated dewar having a distal end adjacent to and spaced from said pressure vessel distal end and arranged to contact a surface to be cooled, said coupler means being interposed between the distal ends of said pressure vessel and dewar, said vibration isolation gap being positioned between said coupler and said distal end of said pressure vessel to decouple vibration of said pressure vessel distal end from the distal end of said dewar.

4. The cryogenic cooler of claim 3 wherein said dewar has a proximal end connected to said flange, and including vibration blocking means interconnecting said flange to a proximal end of said pressure vessel, whereby said pressure vessel is vibration-isolated at both its proximal and distal ends.

5. The cryogenic cooler of claim 2 wherein said end cap includes an axially extending protrusion defining a distally facing shoulder and a radially outwardly facing protrusion surface, said coupler comprising a cylindrical hollow body that is a tight slip fit on said protrusion at higher temperatures, said coupler having an axially facing proximal end adjacent said shoulder and a radially inwardly facing coupler surface adjacent said protrusion surface, said axially facing proximal end of said coupler being spaced from said shoulder and said radially inwardly facing coupler surface being spaced from said protrusion surface at lower temperatures.

6. The invention of claim 5 including means mounted within said flange for dissipating vibration therein.

7. A cryogenic cooler comprising:
    a flange and an elongated pressure vessel extending therefrom, said pressure vessel being connected to said flange at a proximal end thereof, and said cryogenic cooler mounted to cool a surface in the proximity of the distal end of said pressure vessel;
    a coupler mounted between the distal end of said pressure vessel and said surface, said coupler being positioned tightly against said pressure vessel distal end at higher temperature, and being spaced from said pressure vessel distal end at lower temperature for maintaining a vibration isolation air gap between said distal end of said pressure vessel and the proximal end of said coupler at cryogenic temperatures, said coupler having a coefficient of thermal expansion which is different from the coefficient of thermal expansion of said end cap; and
    means, including a ring of energy-absorbing material, mounted within said flange for dissipating vibration therein.

8. A method for improving the performance of a cryogenic cooler having a flange and an elongated pressure vessel extending therefrom, said pressure vessel being connected to said flange at a proximal end thereof, said pressure vessel having an end cap at the distal end thereof, and said cryogenic cooler being mounted to cool a surface in the proximity of the distal end of said pressure vessel; said method including the step of:
    mounting a coupler between the distal end of said pressure vessel and said surface,
    holding said coupler tightly against said distal end of said pressure vessel at higher temperature, and causing one of said coupler and pressure vessel distal end to contract more than the other at lower temperatures to cause the coupler to be displaced from said distal end of said pressure vessel at lower temperature for maintaining an air gap between said distal end of said pressure vessel and said coupler at cryogenic temperatures.

9. The method of claim 8 including the step of providing an energy-absorbing material in said flange for damping vibration therein.

10. A cryogenic cooling system for cooling a surface of an object, said system comprising:
    an elongated dewar having a proximal dewar end and a distal dewar end configured and arranged to contact said surface,
    an elongated cryogenic cooler in said dewar and having proximal and distal cooler ends respectively adjacent said proximal and distal dewar ends, said cooler including means for creating mechanical vibrations that tend to be transmitted to said dewar at both proximal and distal dewar ends, and to said surface via said distal dewar end,
    first vibration isolation means interposed between said proximal dewar and proximal cooler ends,
    second vibration isolation means interposed between said distal dewar and distal cooler ends, whereby said dewar and said surface are vibration isolated from said cryogenic cooler at both ends of said cooler and dewar, and including an end cap on said distal cooler end having an end cap coefficient of thermal expansion, a coupler between said end cap and said distal dewar end. and being engaged with said end cap at relatively higher temperatures, said coupler having a coefficient of thermal expansion that is different from said end cap coefficient of thermal expansion whereby, when temperature of said cooler is lowered, at least portions of said coupler are displaced from said end cap by differential thermal contraction of said end cap and coupler to define a gap that forms said second vibration isolation means.

11. The cryogenic cooling system of claim 10 wherein said gap is not greater than 0.5 mil at cryogenic temperatures.

12. The cryogenic cooling system of claim 10 including an end cap on said distal cooler end, and a coupler interposed between said distal dewar end and said end cap, said coupler having a coefficient of thermal expansion that is different from the coefficient of thermal expansion of said end cap, said coupler being mounted for motion between a higher temperature position in close contact with said end cap and a lower temperature position in which an air gap is formed between the end cap and the coupler.

13. The cryogenic cooling system of claim 12 wherein said air gap is complete and continuous such that no part of said coupler contacts said end cap at lower temperatures.

14. The cryogenic cooling system of claim 13 wherein said end cap includes a protrusion, a fastener extending through said coupler into said end cap and being free of contact with said coupler and with the distal end of said dewar, said end cap having a radially facing protrusion surface and an axially facing shoulder, said air gap being formed at said radially facing protrusion surface and said axially facing shoulder.

* * * * *